US007525107B2

United States Patent
Nakagaki et al.

(10) Patent No.: US 7,525,107 B2
(45) Date of Patent: Apr. 28, 2009

(54) APPARATUS AND METHOD FOR FORMING AN ALIGNMENT LAYER

(75) Inventors: Johji Nakagaki, Yasu (JP); Akihiro Asahara, Sagamihara (JP); Hideo Kimura, Shiga (JP); Hiroaki Kitahara, Otsu (JP); Tatsuya Nishiwaki, Yasu (JP); Yasuhiko Shiota, Otsu (JP); Takeshi Yamada, Kusatsu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/566,716

(22) Filed: Dec. 5, 2006

(65) Prior Publication Data

US 2008/0011969 A1 Jan. 17, 2008

(30) Foreign Application Priority Data

Dec. 12, 2005 (JP) ............................. 2005-358324

(51) Int. Cl.
*G21G 5/00* (2006.01)
(52) U.S. Cl. ................................. 250/492.21
(58) Field of Classification Search ............ 250/492.21; 349/123, 124, 129; 430/321, 325
See application file for complete search history.

(56) References Cited

U.S. PATENT DOCUMENTS

| 6,849,858 | B2 * | 2/2005 | Okazaki et al. | 250/492.3 |
| 7,057,692 | B2 * | 6/2006 | Nakano et al. | 349/124 |
| 2004/0227883 | A1 | 11/2004 | Lee et al. | |

FOREIGN PATENT DOCUMENTS

JP    PUPA 2004-37875    2/2004

* cited by examiner

*Primary Examiner*—Kiet T Nguyen
(74) *Attorney, Agent, or Firm*—James R. Nock; Shimokaji & Associates, P.C.

(57) ABSTRACT

An apparatus and method for forming an alignment layer with uniform orientation is provided. An alignment layer-forming apparatus includes an ion source for generating ion beams and one or more masks disposed between the ion source and a substrate. The masks each have a reflective face directed to the substrate. The ion beams are reflected between the reflective face of each mask and a thin-film which is disposed on the substrate and which is processed into an alignment layer, whereby the alignment layer is formed with the ion beam finally applied to the thin-film. The orientation of a liquid crystal can be rendered uniform by varying the shape and/or arrangement of the reflective face of the mask. Hence, a liquid crystal display with no brightness or color non-uniformity can be manufactured.

3 Claims, 9 Drawing Sheets

TRAVELING DIRECTION OF SUBSTRATE

α : INCIDENT ANGLE
β : ORIENTATION CORRECTION TILT ANGLE
γ : FACE TILT ANGLE
p : PITCH

APPARATUS AND METHOD FOR FORMING AN ALIGNMENT LAYER

FIELD OF THE INVENTION

The present invention relates generally to liquid crystals, and more particularly to an apparatus and method for forming a liquid-crystal alignment layer by ion beam irradiation.

BACKGROUND OF THE INVENTION

In a liquid crystal display (LCD), the orientation direction of a liquid crystal is controlled with an alignment layer disposed on a substrate. The alignment layer is formed in such a manner that a thin-film made of polyimide or an inorganic material is irradiated with ion beams such that the bonds between atoms in the thin-film are broken. If the surface of the thin-film is subjected to alignment processing, that is, alignment treatment, effective in aligning the liquid crystal by ion beam irradiation, the distribution of the irradiation direction of the ion beams corresponds to that of the orientation direction of the liquid crystal. Hence, it is preferable that the spread of the ion beams be small and the ion beams be aligned in a predetermined direction.

Figure 1A:
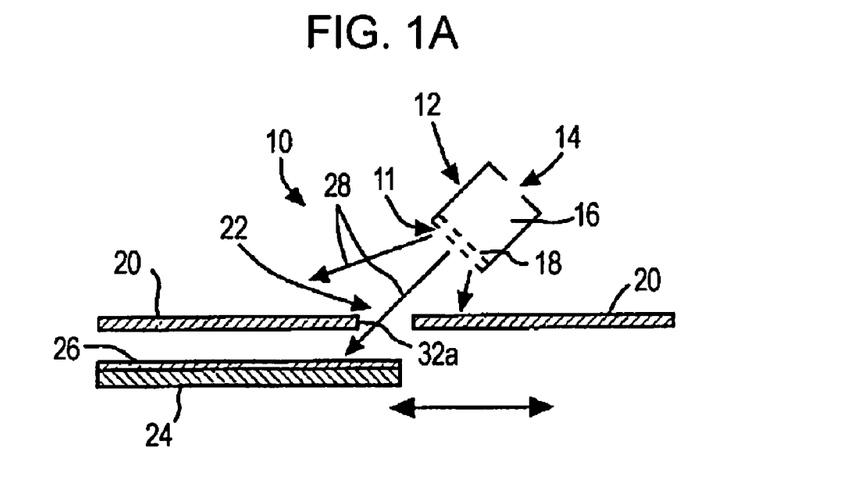
FIG. 1A is a sectional view of a conventional apparatus for forming an alignment layer.
Figure 1B:
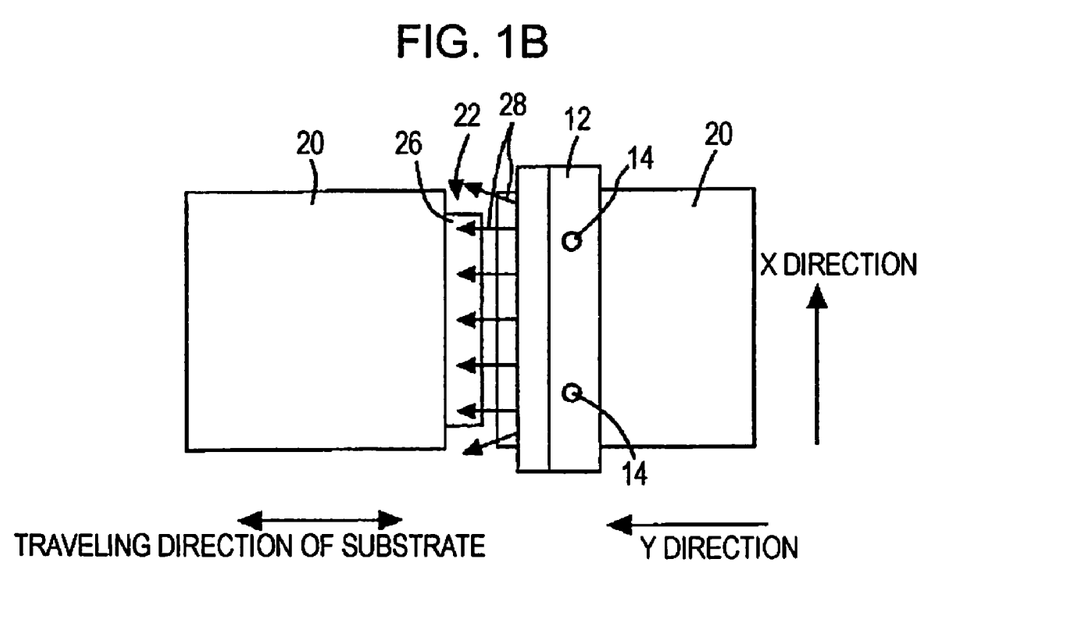
FIG. 1B is a plan view of the conventional apparatus shown in FIG. 1A.

According to a conventional technique, as shown in FIGS. 1(a) and 1(b), ion beams 28 are applied to a thin-film 26 while a substrate 24 is being moved close to or away from an ion source 12. Since the ion beams 28 spread as described below, a mask (a shielding plate) 20 is used to apply only some of the ion beams 28 that are useful in forming an alignment layer to the thin-film 26 through a slit 22. In order to subject the entire surface of the thin-film to alignment treatment uniformly, it is ideal that ions are applied to the thin-film 26 in such a manner that the ions form parallel beams with uniform ion density.

The orientation direction of a liquid crystal needs to be uniform over the alignment layer. The misorientation of the liquid crystal causes brightness or color non-uniformity in liquid crystal panels. Therefore, in order to manufacture a high-image-quality liquid crystal panel, the liquid crystal needs to be more uniformly oriented.

In order to uniformly orient the liquid crystal, the ion beams emitted from the ion source need to have uniform density. The density of the ion beams is rendered uniform by controlling the density of gas in a plasma-generating chamber and the density of generated free electrons.

As shown in FIG. 1, the ion source for generating the ion beams 28 usually includes a plurality of sheet-shaped grids 11. Each grid 11 has a plurality of outlets for emitting the ions. The ion beams 28 emitted through the outlets spread. In order to allow the ion beams to have uniform intensity or density distribution, the outlets have different sizes depending on the ion density in the ion source as disclosed in U.S. Pat. No. 6,849,858.

If a region extending in the X direction in FIG. 1B, that is, in the direction perpendicular to the traveling direction of the substrate, is irradiate with the ion beams with different intensities, misorientation occurs in the thin-film 26 subjected to alignment treatment.

U.S. Pat. No. 7,057,692 discloses that the ion beams 28 are aligned in one direction in such a manner that the shape of an edge 32a of the mask 20 that defines the slit 22 is varied or corrected depending on the orientation direction of the liquid crystal.

The above conventional techniques have the following problems: a problem that an apparatus needs to be precisely manufactured, for example, the grid needs to be precisely machined such that the ion beams emitted from the ion source have uniform density and/or the mask edge needs to be precisely shaped such that the ion beams are aligned in one direction and a problem that the process time required to apply the ion beams to the irradiation region becomes long because the irradiation region is narrow.

SUMMARY OF THE INVENTION

The present invention provides an apparatus and method for forming a liquid-crystal alignment layer by ion beam irradiation. The apparatus need not be extremely precisely manufactured, for example, a grid need not be extremely precisely machined or a mask edge need not be extremely precisely shaped. The apparatus and the method are useful in rendering the orientation of the alignment layer uniform without narrowing a region irradiated with an ion beam. Since the orientation thereof is uniform, a liquid crystal display with a uniform image quality, having no brightness or color non-uniformity, can be obtained.

In one embodiment, the present invention provides an apparatus and method for forming a liquid-crystal alignment layer by ion beam irradiation. This apparatus and this method are capable of adjusting the pre-tilt angle of liquid crystals to a desired value. Since the pre-tilt angle of liquid crystals can be adjusted to a desired value, a liquid crystal display can be improved in display quality including a viewing angle property.

According to an aspect of the present invention, an alignment layer-forming apparatus includes an ion source for applying a plurality of ion beams to a thin-film disposed on a substrate and a mask (a shielding plate), disposed between the substrate and the ion source, having a reflective face for reflecting the ion beams toward the substrate. The alignment layer is formed in such a manner that the ion beams are reflected toward a thin-film disposed on the substrate by the reflective face in a predetermined direction, that is, an orientation direction, whereby the orientation direction of a liquid crystal is uniformly aligned.

The predetermined direction is the same as the orientation direction of the liquid crystal and the mask has a reflective face for varying the incident angle of the ion beams with respect to the thin-film depending on the predetermined pre-tilt angle. That is, the incident angle of the ion beams with respect to the thin-film is varied by reflecting the ion beams with the reflective face depending on the desired pre-tilt angle.

The reflective face of the mask that is directed to a surface of the substrate is flat and is tilted with respect to the substrate surface such that the ion beams are reflected forward. Furthermore, the reflective face of the mask is tilted with respect to the traveling direction of the substrate, whereby the propagation direction of the ion beams having a spread angle is aligned in the orientation direction. The orientation direction may be parallel to the traveling direction of the substrate. The reflective face of the mask may be tilted with respect to the traveling direction of the substrate such that the tilt angle of the reflective face corresponds to the offset angle of the ion beams with respect to the predetermined direction, that is, the orientation direction. When the alignment layer-forming apparatus further includes a mask tilt control section for controlling the tilt angle of the reflective face with respect to the substrate, that is, the spatial tilt of the reflective face, the position of the reflective face of the mask can be precisely fine adjusted with the mask tilt control section. When the mask has a sawtooth-shaped surface and the reflective face is disposed on the sawtooth-shaped surface and is flat or curved, the ion beams can be reflected in a desired direction. The reflective face of the mask and the thin-film on the substrate, processed into the alignment layer, may be made of the same material.

The mask may have end portions which have a tilt angle with respect to the traveling direction of the substrate and which correspond to a region irradiated with the ion beams having a large spread angle. Furthermore, the tilt angle of the reflective face with respect to the traveling direction of the substrate may be increased stepwise from a center portion to end portions of the mask that correspond to the region irradiated with the ion beams, whereby the ion beams can be aligned in the orientation direction depending on the spread angle of the ion beams.

According to another aspect of the present invention, a method for forming a liquid-crystal alignment layer by processing a thin-film disposed on a substrate includes preparing a substrate having a thin-film processed into the liquid-crystal alignment layer; placing a mask, having a reflective face directed to the substrate, between the substrate and an ion source; conveying the substrate; irradiating the thin-film on the substrate with a plurality of ion beams emitted from the ion source; and reflecting the ion beams with the reflective face in an orientation direction by reflecting the ion beams between the thin-film and the reflective face. The method further includes adjusting the tilt angle of the reflective face of the mask with respect to the substrate. The liquid-crystal alignment layer can be formed and the orientation direction of a liquid crystal can be uniformly aligned in such a manner that the ion beams are reflected by the reflective face in the direction toward the thin-film on the substrate and in the orientation direction of the liquid crystal. The propagation direction of the ion beams may be the same as the traveling direction of the substrate, that is, the substrate may be conveyed in the direction away from the ion source. In this case, the reflective face of the mask is formed such that the spread angle of the ion beams is corrected.

A method for allowing a liquid-crystal alignment layer to have a predetermined pre-tilt angle includes reflecting a plurality of ion beams with a reflective face of a mask toward a thin-film disposed on a substrate such that the incident angle of the ion beams with respect to the thin-film on the substrate corresponds to the predetermined pre-tilt angle. This allows the pre-tilt angle to be freely varied depending on optical design.

According to the present invention, the spread angle (a difference in incident angle) or incident angle of a plurality of ion beams applied to a thin-film disposed on a substrate is controlled by the secondary reflection (even-numbered order reflection) of the ion beams by a reflective face of a mask, whereby a uniform alignment layer can be formed or the pre-tilt angle of a liquid crystal can be controlled. This allows a high-image-quality liquid crystal display having no brightness or color non-uniformity to be manufactured.

BRIEF DESCRIPTION OF THE DRAWINGS

FIG. 5 includes views showing the propagation direction of an ion beam reflected by a flat face of a mask, the flat face being directed to and parallel to a substrate.

FIG. 6 includes views showing the relationship between a substrate and a mask having a tilt arrangement of a flat reflective face.

FIG. 8 includes views showing the relationship between the arrangement of reflective faces of a mask and the irradiation direction and reflection direction of an ion beam.

FIG. 9 includes views showing the relationship between the propagation direction of ion beams and a mask with a sawtooth-shaped surface having reflective faces arranged in end regions of the surface.

FIG. 10 includes views showing masks.

DETAILED DESCRIPTION

Figure 2:
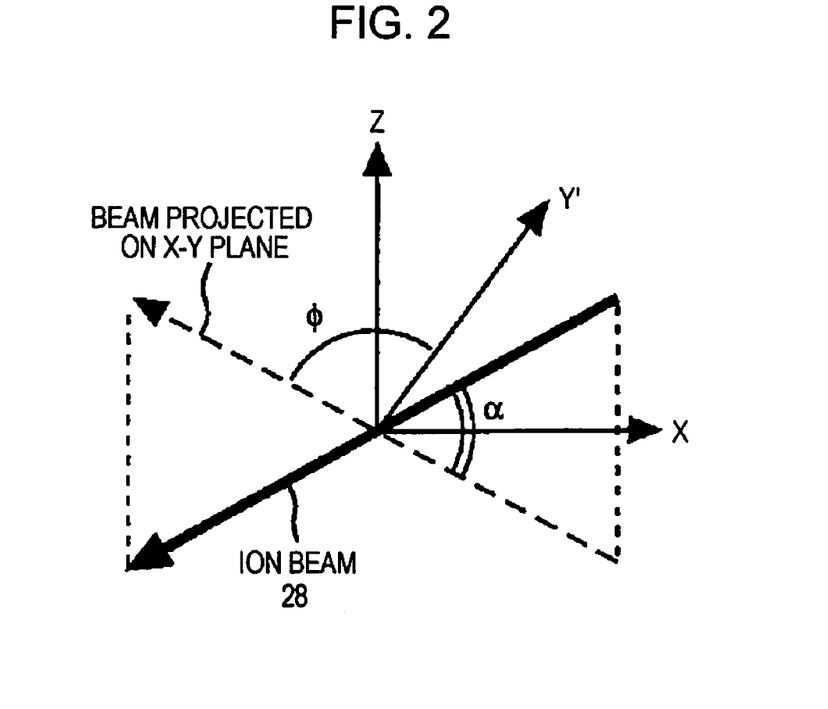
FIG. 2 is an illustration showing the relationship between an ion beam and planes shown in FIGS. 1A and 1B.

Apparatuses and methods for forming alignment layers according to embodiments of the present invention will now be described with reference to the attached drawings. The orientation direction of a liquid crystal is defined as the direction in which the longitudinal axes of molecules of the liquid crystal are aligned in the X-Y plane when the liquid crystal molecules are projected onto a substrate 24. The orientation direction of the liquid crystal depends on the density distribution of ion beams 28 and Angle $\phi$ in FIG. 2, that is, Angle $\phi$ (an azimuth angle) between the Y axis (actually a line parallel to the Y axis) and each ion beam 28 projected onto the X-Y plane (a plane parallel to the substrate 24 or a mask 20). With reference to FIG. 2, Angle α (an elevation angle) represents the incident angle of the ion beam 28 with respect to the X-Y plane.

Figure 3:
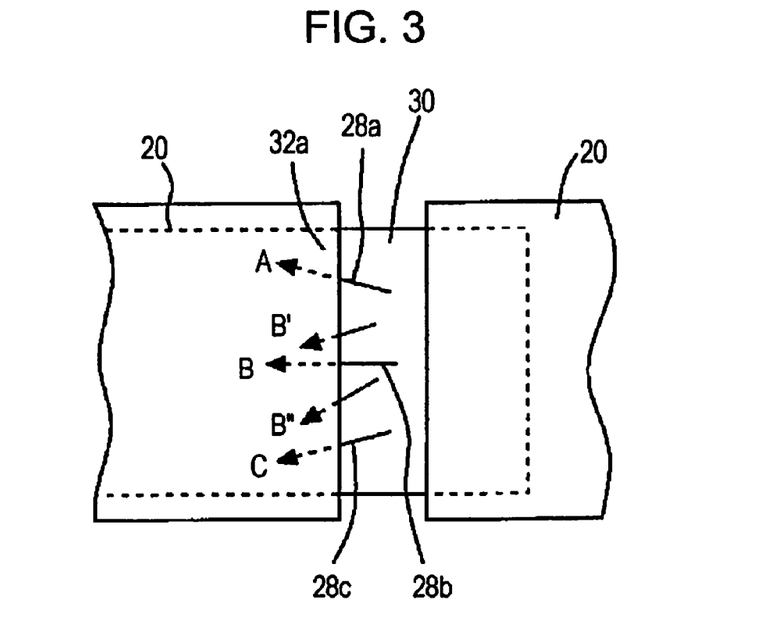
FIG. 3 is an illustration showing the spread angle of ion beams applied to locations on a thin-film.

With reference to FIG. 3, the ion beams 28 are emitted from an ion source and usually have a spread distribution, that is, the ion beams 28 are offset from a desired or target irradiation direction. The ion source usually has a large number of outlets or exit apertures for emitting a plurality of the ion beams 28, which travel in different directions. For example, as shown in FIG. 3, Point B on a thin-film 26 is irradiated with the ion beams 28 traveling from different directions. That is, the ion beams have a spread (between Point B and Point B") or a narrow (between Point B and Point B') and do not necessarily travel in parallel to each other. If Angle φ varies depending on locations on the thin-film, the liquid crystal molecules are not aligned in one direction. This causes brightness non-uniformity and/or color non-uniformity in liquid crystal display. If Angle φ varies depending on Points A, B, and C, present on the thin-film 26, irradiated with the ion beams 28a, 28b, and 28c, respectively, the orientation direction of the liquid crystal is nonuniform. When the Y axis in FIG. 2 is a desired orientation direction, Angle φ is preferably zero (0) for every location on the thin-film 26, that is, the desired orientation direction is preferably parallel to the Y axis. Angle φ is hereinafter referred to as an offset angle φ.

It has been found that the ion beams 28, finally applied to locations on the thin-film 26, and having energy sufficient to break the bonds between atoms in a surface domain of the thin-film that is involved in orientation, affect the orientation direction of the liquid crystal. That is, it is effective that the ion beams 28 finally applied to all locations on the thin-film 26 are aligned in one direction. The present invention is characterized in that a mask has a reflective face directed to a substrate, ion beams that spread or are offset from a desired orientation direction are reflected forward by the reflective face such that the offset of each ion beam from the desired orientation direction is corrected, and the ion beams are allowed to travel in parallel to the Y axis when the desired orientation direction is parallel to the Y axis. That is, the present invention provides an apparatus and method for forming an alignment layer, the apparatus and the method being capable of aligning the ion beams in the desired orientation direction by adjusting the tilt angle of the reflective face with respect to regions irradiated with the ion beams.

Figure 4:
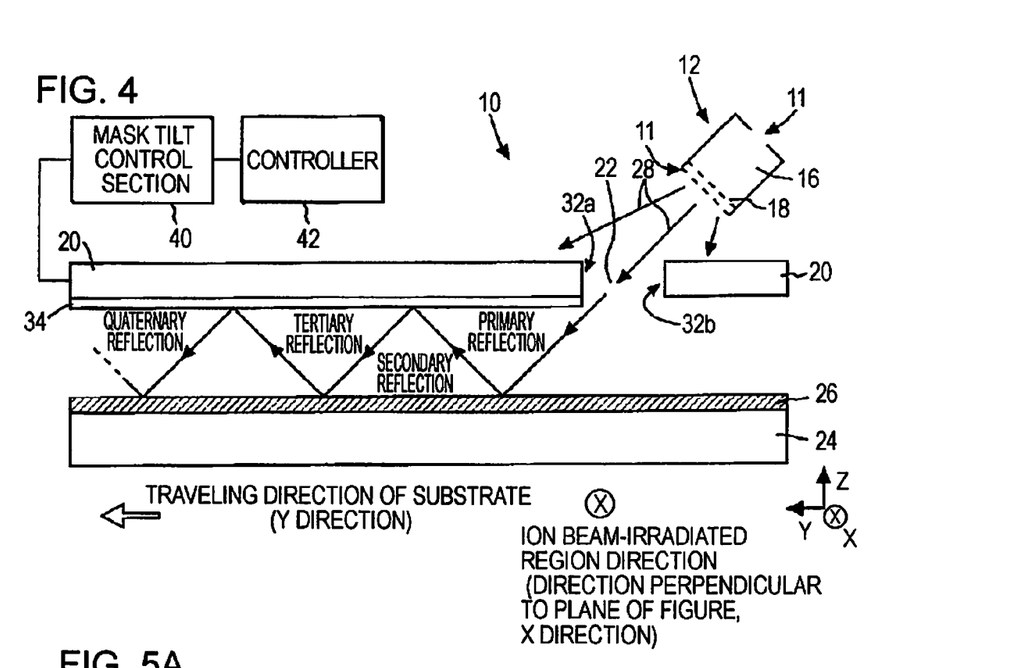
FIG. 4 is an illustration showing the relationship between a substrate and an apparatus for forming an alignment layer according to an embodiment of the present invention.

An apparatus, according to an embodiment of the present invention, for forming an alignment layer using a mask having a reflective face will now be described. With reference to FIG. 4, the alignment layer-forming apparatus 10 includes an ion source 12 for generating ion beams 28 and one or more masks 20 disposed between a substrate 24 and the ion source 12. The masks 20 each have a reflective face 34 directed to the substrate. Two of the masks 20 are arranged in parallel to the substrate 24 in the same level as shown in FIG. 1A and edges 32a and 32b of the masks 20 define a slit 22. The two masks 20 are used herein and one monolithic mask may be used. The slit is preferably used and may be omitted. The reflective face 34 is directed to the substrate, the substrate 24 is mounted on a movable table (not shown), and the ion beams are then applied or irradiated to a thin-film 26 disposed on the substrate while the substrate is being moved usually at a constant speed in the direction away from the ion source, that is, in the traveling direction of the substrate as indicated by an arrow shown in FIG. 4. The ion beams 28 are reflected between the reflective face 34 and the thin-film 26 to be processed into the alignment layer and the alignment layer is finally formed by the last irradiation of the thin-film 26 with the ion beams. This is due to that the bonds between atoms in the thin-film are broken with the ion beams reflected by the reflective face 34.

The ion source 12 includes a plasma-generating chamber 16, a gas inlet 14 for introducing gas into the plasma-generating chamber 16, an accelerating electrode 18 for accelerating ions generated in the plasma-generating chamber 16, and a sheet-shaped grid (or grids) 11 having a plurality of ion outlets for emitting the accelerated ions. The grid 11 has a rectangular shape and the ion outlets are uniformly arranged in the grid 11. The gas used is, for example, argon (Ar). If argon gas is used, argon ions ($Ar^+$) are generated in the plasma-generating chamber 16. The gas used is not limited to argon and inert gas such as neon or xenon may be used. Alternatively, the following gas or gas mixture may be used: gas, such as hydrogen, nitrogen, methane, or acetylene, containing an element contained in the alignment layer or a gas mixture of some of these gases.

A method for forming a liquid-crystal alignment layer using a reflective face of a mask will now be described. As shown in FIG. 4, the thin-film 26 on the substrate is irradiated with the ion beams 28 having an energy of 50 to 1000 eV while the substrate 24 having the thin-film 26 placed thereon is being conveyed at a speed of 1 to 100 mm/s in the direction away from the ion source 12 (in the same direction as that in which the ion beams 28 are emitted), that is, in the traveling direction (the Y direction) of the substrate shown in FIG. 4. The longitudinal direction of a narrow region irradiated with the ion beams is referred to as an ion beam-irradiated region direction (the X direction), which is perpendicular to the traveling direction of the substrate (the direction perpendicular to the plane of FIG. 4) and corresponds to the direction in which the ion outlets are arranged. As shown in FIG. 4, the ion beam-irradiated region direction, the traveling direction of the substrate, and the direction perpendicular to the X-Y plane are hereinafter referred to as the X direction, the Y direction, and the Z direction, respectively. The ion beams 28 incident onto the thin-film placed on the substrate 24 are primarily reflected by the surface of the thin-film, are secondarily reflected by the reflective face 34, and then reach the thin film surface again, whereby the bonds between atoms in a surface domain of the thin-film are broken, resulting in the conversion of the thin-film into the alignment layer or alignment film. The energy of the ion beams may be adjusted such that the bonds between atoms are broken by the quaternary and/or senary reflection of the ion beams. Alternatively, as shown in FIG. 4, a mask tilt control section 40 may be used and the tilting operation of the mask may be controlled with a controller 42, whereby the position of the mask is adjusted such that the tilt angle of the reflective face with respect to the substrate, that is, the spatial tilt of the reflective face is varied. This allows the tilt angle of the reflective face 34 to be varied to control the direction of the reflected ion beams. Furthermore, the following system may be used: a computer system which optically detect the offset angle of the ion beams applied to the thin-film and which automatically control the mask tilt control section in response to detected information. As described above, the present invention is based on that since the ion beams reflected by the reflective face are applied to the thin-film on the substrate, the ion beams have energy sufficient to break the bonds between the atoms in the thin-film and final reflected components of the ion beams reflected by the thin-film determine the liquid crystal orientation of the alignment layer.

Figure 5A:
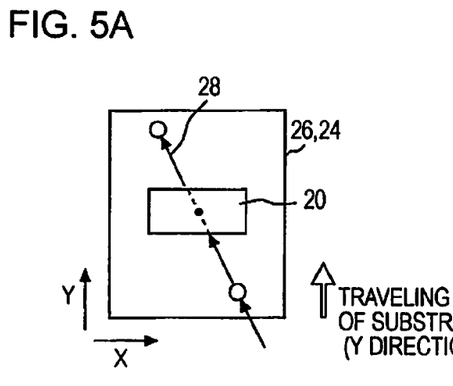
FIG. 5A is a plan view of the mask.
Figure 5B:
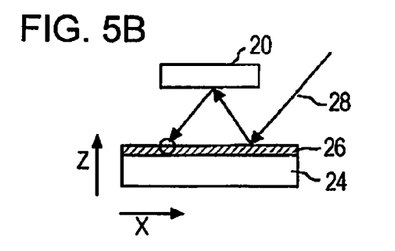
FIG. 5B is a front view showing the substrate and mask observed in the ion beam-irradiated region direction.
Figure 5C:
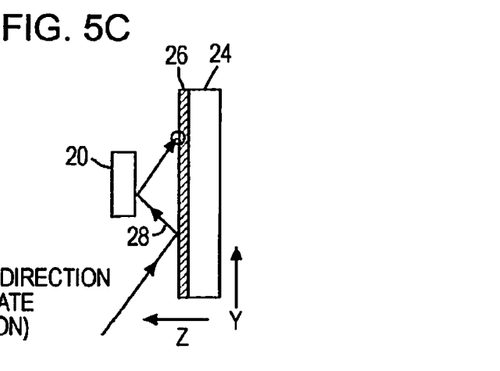
FIG. 5C is a side view showing the substrate and mask observed in the traveling direction of the substrate.
Figure 6A:
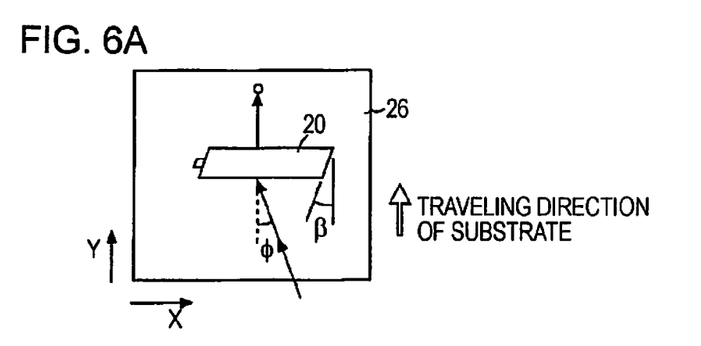
FIG. 6A is a plan view showing the mask and the substrate.
Figure 6B:
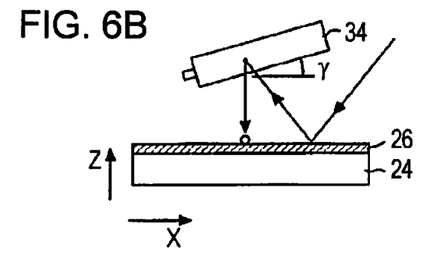
FIG. 6B is a front view showing the substrate and mask observed in the ion beam-irradiated region direction.
Figure 6C:
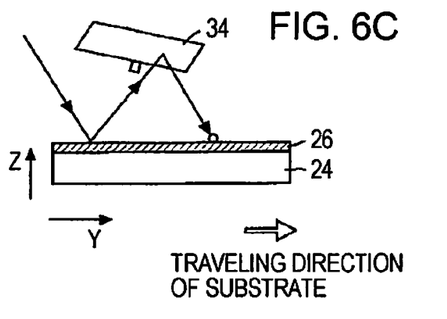
FIG. 6C is a side view showing the substrate and mask observed in the traveling direction of the substrate.

A conventional mask 20 has a flat face directed to a substrate and is arranged such that the flat face is parallel to the substrate. In general, this mask is used to define a region irradiated with ion beams emitted from an ion source. FIG. 5 shows an example of the propagation direction of the ion beam 28 presumed to be reflected by the flat face of the mask 20. FIG. 5A is a plan view of the mask, FIG. 5B is a front view showing the mask and substrate observed in the ion beam-irradiated region direction, and FIG. 5C is a side view showing the mask and substrate observed in the traveling direction of the substrate. As shown in FIG. 5A, if the ion beam 28 is reflected by the flat face of the mask 20, the ion beam 28 is reflected in one (or straight) direction and the reflection direction of the ion beam 28 is not varied because the mask 20 is placed in parallel to the substrate 24. The reflected ion beam 28 is applied to a thin-film 26 disposed on the substrate while the ion beam 28 is spreading without varying reflecting direction. In other words, since the mask 20 has a reflective face 34 which is flat and parallel to the substrate and which is directed to the substrate, the ion beam that is reflected in one direction and then secondarily reflected reaches the thin-film (the reflective face is not shown in FIG. 5). That is, the irradiation direction of the ion beam agrees with the orientation direction, an alignment layer can be formed with the ion beam secondarily reflected without varying the direction of the ion beam. On the other hand, that mask 20 shown in FIG. 4 has that reflective face 34 directed to that substrate and that reflective face 34 is tilted with respect to that substrate as shown in FIG. 6. That is, the ion beams primarily reflected upward by that thin-film disposed on that substrate are reflected forward depending on the tilt angle γ offset from the X-axis direction such that the resulting ion beams are directed toward that thin-film. The ion beams are directed in a desired direction (for example, the direction parallel to the Y-axis direction when the desired direction is the Y-axis direction that is the traveling direction of that substrate) depending on the tilt angle β offset from the Y-axis direction. FIG. 6A is a plan view showing a mask and a substrate, FIG. 6B is a front view showing this mask and substrate observed in the ion beam-irradiated region direction, and FIG. 6C is a side view showing this mask and substrate observed in the traveling direction of this substrate. The arrangement shown in FIG. 6 is hereinafter referred to as "the tilt arrangement of a flat reflective face". An ion beam is reflected forward in a desired orientation direction in such a manner that the offset angle φ between the desired orientation direction and the direction of the ion beam primarily applied to a thin-film disposed on a substrate is corrected. This is particularly effective in the case where the ion beam is offset from the desired direction in one direction. The tilt angle of the reflective face with respect to the traveling direction of the substrate (the Y-axis direction) is hereinafter referred to as an orientation correction tilt angle β and the tilt angle of the reflective face with respect to the substrate is hereinafter referred to as a face tilt angle γ. The face tilt angle γ is preferably adjusted to retain the constant incident angle α of the ion beam applied to the thin-film on the substrate and is not limited to this angle.

Figure 7:
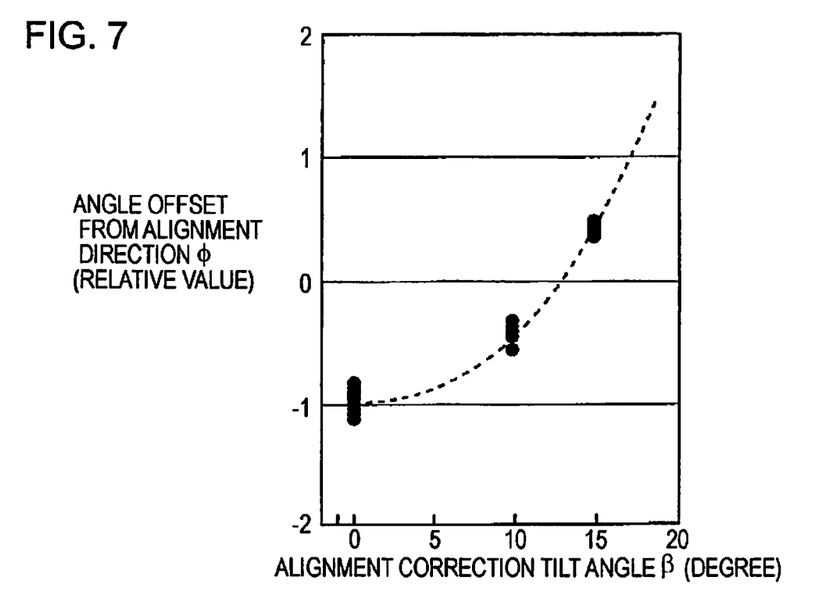
FIG. 7 is a graph showing the relationship between the orientation correction tilt angle $\beta$ and the offset angle $\phi$ of a tilted reflective face from an orientation direction.

FIG. 7 shows how the angle φ offset from an orientation direction is corrected by varying the orientation correction tilt angle β using the tilt arrangement of a flat reflective face. The correction is explained using an incident ion beam of which the offset angle φ from the orientation direction is −1 (relative value). As shown in FIG. 7, an increase in the orientation correction tilt angle β from zero degree (that is, the flat reflective face is not tilted) to 15 degrees by tilting the flat reflective face increases the angle φ offset from the orientation direction of a liquid crystal from −1 to +0.3 (relative value). The angle φ offset from the orientation direction of the liquid crystal can be detected by optically measuring a liquid crystal panel that is prepared in such a manner that a panel prepared by stacking two substrates facing each alignment-treated thin-film on each substrate and then sealing the stacked substrates with a sealant and the liquid crystal is injected between the resulting substrates or empty cell. Alternatively, the angle offset from the orientation direction can be detected by optically measuring the surface profile of a thin-film disposed on a substrate. FIG. 7 illustrates that the angle φ offset from the orientation direction can be reduced to zero, that is, the ion beam can be aligned with a desired orientation direction by adjusting the orientation correction tilt angle β to about 13 degrees in this example. In other words, in the tilt arrangement of the flat reflective face, the orientation direction of the liquid crystal can be controlled in such a manner that the angle φ offset from the orientation direction is varied by varying the orientation correction tilt angle β.

For the shape of a reflective face 34 of a mask 20, a mask used for ion beam irradiation in which the spread of beams is wide may have a sawtooth-shaped surface having reflective faces which are tilted with respect to a substrate and which are arranged at a small pitch p in the X-axis direction in FIG. 4. In this case, the distances (gaps) between the substrate and the reflective faces of the mask can be maintained substantially constant as compared to "the tilt arrangement of a flat reflective face"; hence, differences between the directions of ion beams reflected by the reflective faces can be reduced.

Figure 8A:
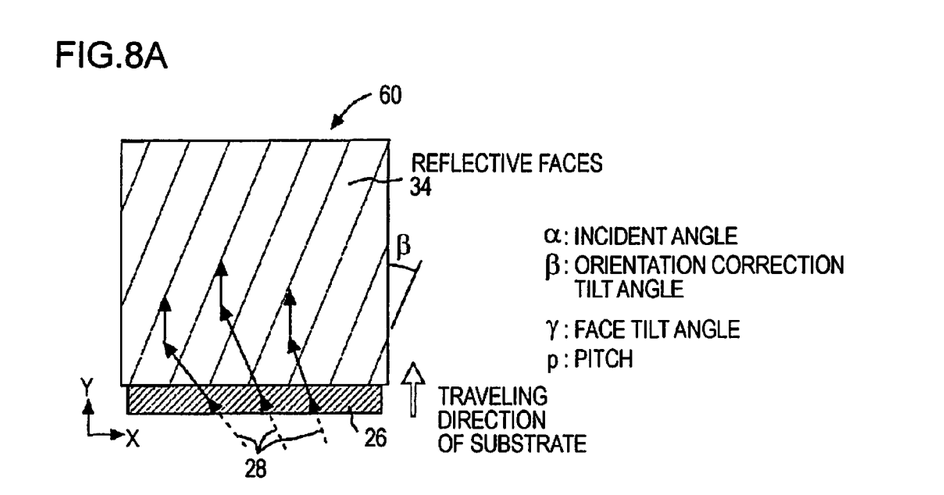
FIG. 8A is a plan view of the mask.
Figure 8B:
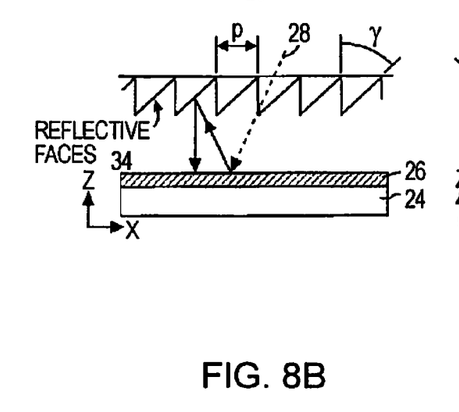
FIG. 8B is a front view showing the mask and a substrate observed in the ion beam-irradiated region direction.
Figure 8C:
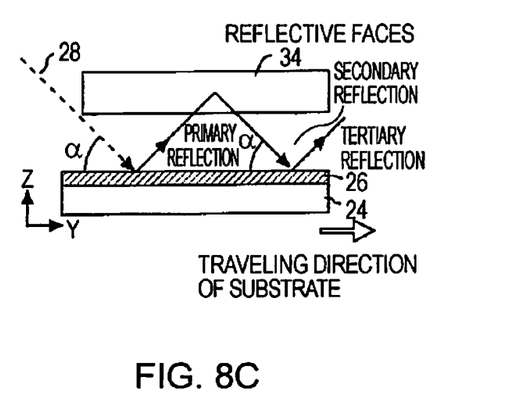
FIG. 8C is a side view showing the mask and substrate observed in the traveling direction of the substrate.

FIG. 8 includes views for illustrating a monolithic mask 60 having a plurality of reflective faces arranged in a sawtooth pattern. FIG. 8A is a plan view of the monolithic mask 60, FIG. 8B is a front view showing the monolithic mask 60 observed in the ion beam-irradiated region direction, and FIG. 8C is a sectional view showing the monolithic mask 60 and substrate observed in the traveling direction of the substrate. With reference to FIG. 8, the reflective faces 34 arranged in such a sawtooth pattern are spaced at a pitch p in the X-axis direction and have a face tilt angle γ and an orientation correction tilt angle β. The monolithic mask 60 is placed so as to have an orientation correction tilt angle β with respect to the Y-axis direction (parallel to the traveling direction of the substrate). Ion beams 28 incident onto a thin-film 26 disposed on the substrate 24 are primarily reflected by the thin-film surface and secondarily reflected by the reflective faces. The resulting ion beams 28 then reach the thin-film surface to break the bonds between atoms in a surface domain of the thin-film, whereby an alignment layer is formed. Since the reflective faces are tilted (principally due to the setting of the orientation correction tilt angle β), the propagation directions of the ion beams secondarily reflected are corrected with the reflective faces 34 with respect to the Y-axis direction, that is, in the X-Y plane (the surface of the thin-film on the substrate), whereby the ion beams are aligned in a desired orientation direction, that is, in the Y-axis direction in FIG. 8 and then applied to the thin-film 26 on the substrate 24 (see FIG. 8A). The face tilt angle γ of the reflective faces may be set such that the incident angle α of the ion beams with respect to the thin-film surface is maintained (see FIG. 8C).

Figure 9A:
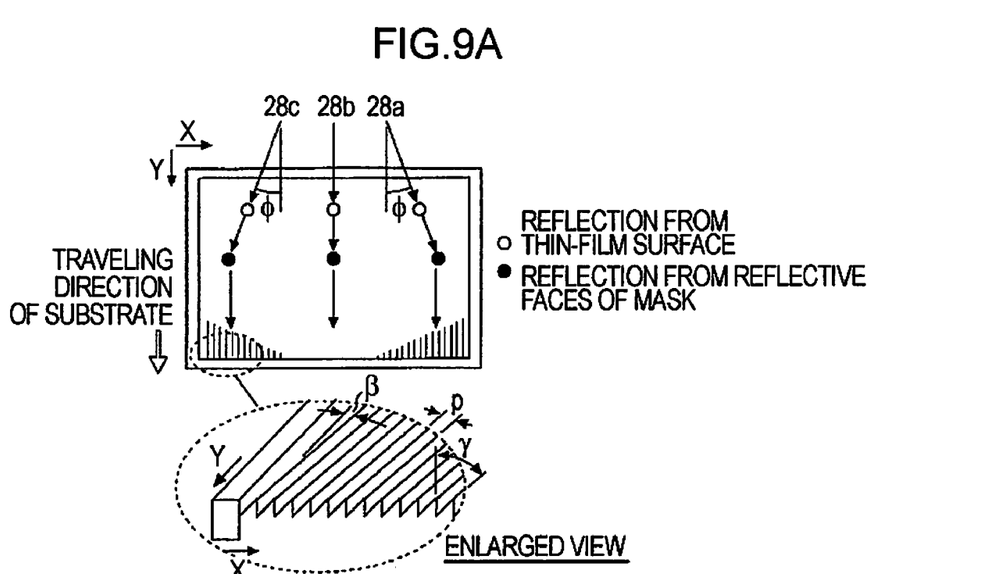
FIG. 9A is a plan view of the mask.
Figure 9B:
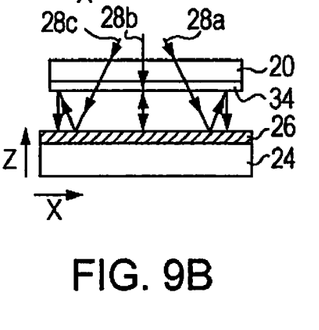
FIG. 9B is a front view showing the mask and a substrate observed in the ion beam-irradiated region direction.
Figure 9C:
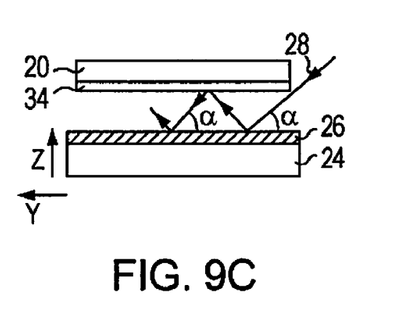
FIG. 9C is a side view showing the mask and substrate observed in the traveling direction of the substrate.

In general, as shown in FIG. 1B, beams 28 emitted from outlets located close to both ends of a grid of an ion beam apparatus are likely to spread; hence, it is effective to set the orientation correction tilt angle of end portions of a mask (both ends of the mask observed the ion beam-irradiated region direction) that correspond to the ends of the grid to a large value. FIG. 9 shows the relationship between the propagation direction of ion beams and a mask with a sawtooth-shaped surface having reflective faces arranged in end regions of the surface. FIG. 9A is a plan view of the mask, FIG. 9B is a front view showing the mask and substrate observed in the ion beam-irradiated region direction, and FIG. 9C is a side view showing the mask and substrate observed in the traveling direction of the substrate. As shown in FIG. 9, the reflective faces located in a center portion of the mask are set in parallel to the substrate because the directions of the ion beams incident onto the center portion of the mask 20 are not offset from a desired orientation direction. In this case, the ion beams 28b are primarily and secondarily reflected straight by the center portions thereof and then applied to a thin-film 26 disposed on the substrate 24 in such a manner that the angle of each ion beam 28b with respect to the traveling direction of the substrate (the Y-axis direction) is maintained. In contrast, the ion beams 28a and 28c reflected by end portions of the mask are incident onto the thin-film 26 on the substrate 24 in such a manner that the ion beams 28a and 28c are offset from the desired orientation direction at an angle φ. Therefore, in order to render the orientation direction uniform over the thin-film 26, it is effective that the ion beams secondarily reflected are aligned in the traveling direction of the substrate (the Y-axis direction) by correcting the offset angle φ in the ion beams secondarily reflection such that the propagation directions of the ion beams reflected by the end portions are aligned with those of the ion beams reflected by the center portions. The offset angle φ of the ion beams is corrected by the secondary reflection using a mask (for example, the mask shown in FIG. 8) having tilted reflective faces arranged in end portions of the mask 20 in a sawtooth pattern as shown in an enlarged view in FIG. 9. The reflective faces arranged in such a sawtooth pattern are spaced at a pitch of 2 mm and have a face tilt angle γ of 45 degrees and the offset angle φ can be reduced by adjusting the orientation correction tilt angle β as shown in FIG. 7. That is, the directions of the ion beams finally applied to the substrate can be aligned in such a manner that the propagation directions of the ion beams, reflected by the center portion, slightly spreading are not varied and the spread angle (about one degree) of the ion beams, reflected by the end portions, relatively greatly spreading is reduced by varying the orientation correction tilt angle β.

The reflective faces arranged in the sawtooth pattern can be formed in such a manner that a reflective film is deposited on a processable material (for example, plastic or metal such as aluminum) by a sputtering process, a chemical vapor deposition (CVD) process, or a dipping process or in such a manner that a reflective film is mechanically bonded to such a processable material. Alternatively, the reflective faces can be formed in such a manner that a graphite material that is hardly sputtered by ion beam irradiation is directly processed so as to have a sawtooth shape.

Figure 10A:
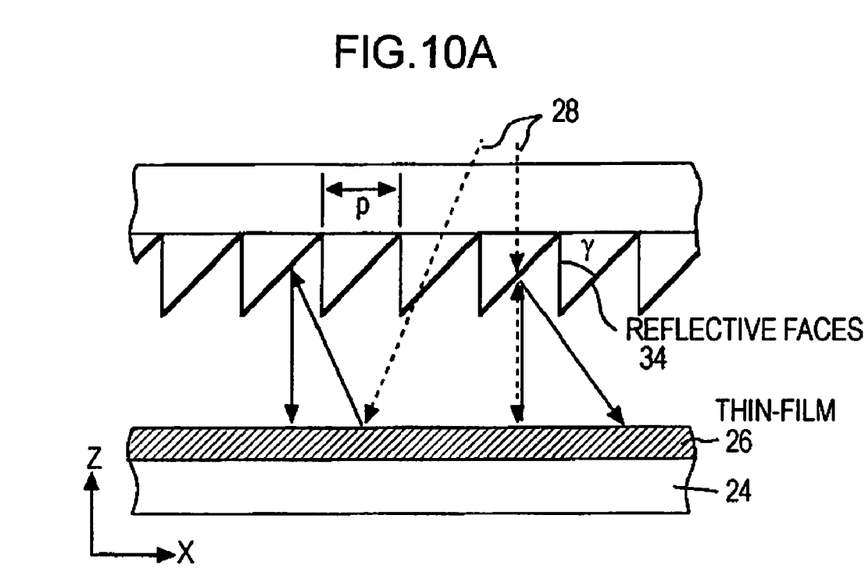
FIG. 10A is a front view of a mask having flat reflective faces arranged in a sawtooth-shaped pattern and FIG. 10B is a front view of a mask having curved reflective faces arranged in a sawtooth-shaped pattern.
Figure 10B:
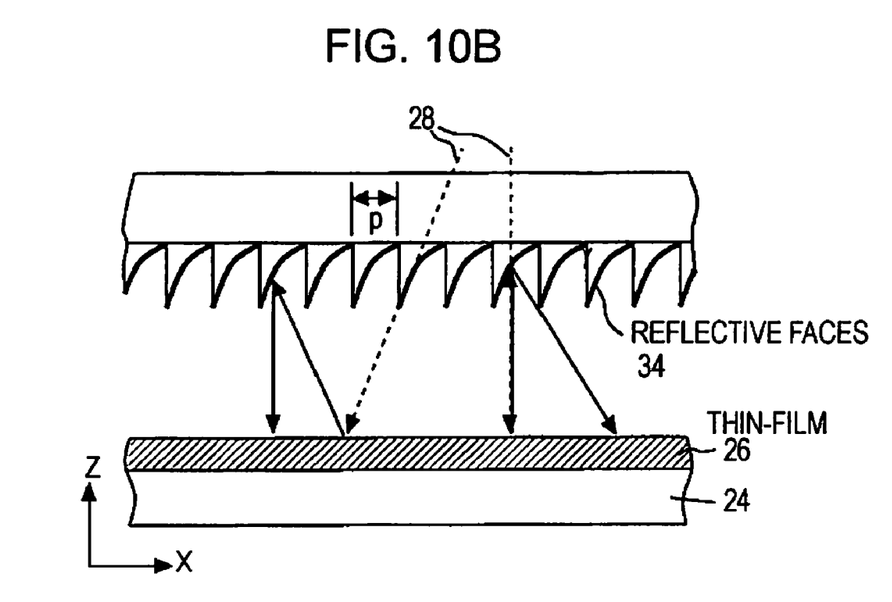

Reflective faces of a mask may be curved although the reflective face shown in FIG. 4 is flat. The reflective faces of the mask, shown in FIG. 8 or 9, having the sawtooth surface may be flat or curved. Reflective faces 34 arranged in a sawtooth pattern as shown in FIG. 10A are flat and have a tilt angle γ. On the other hand, reflective faces 34 arranged in a sawtooth pattern as shown in FIG. 10B are curved.

In order to avoid that atoms emitted from a surface layer of a reflective face of a mask by sputtering the reflective face by ion beam irradiation affect the surface of a thin-film which is disposed on a substrate and which is processed into an alignment layer, it is effective that the reflective face of the mask and the thin-film are made of the same material. Examples of a material for forming the reflective face and the thin-film include polyimide (PI) and diamond-like carbon (DLC). The reflective face may have a thickness of 1 to 1000 nm and the thin-film may have a thickness of 1 to 100 nm. Such a material for forming the reflective face and the thin-film is not limited to these materials and the thicknesses of the reflective face and the thin-film are not limited to the above values. For example, the following material may be used: an organic material such as polyvinyl alcohol (PVA) or an inorganic material that can be orientated by ion beam treatment. If the reflective face is made of a material that has small sputtering yield or is hardly sputtered by an ion beam, the mask has high durability. It is effective that deposits on the reflective face are removed as required such that the reflectivity of the reflective face is maintained.

Figure 11:
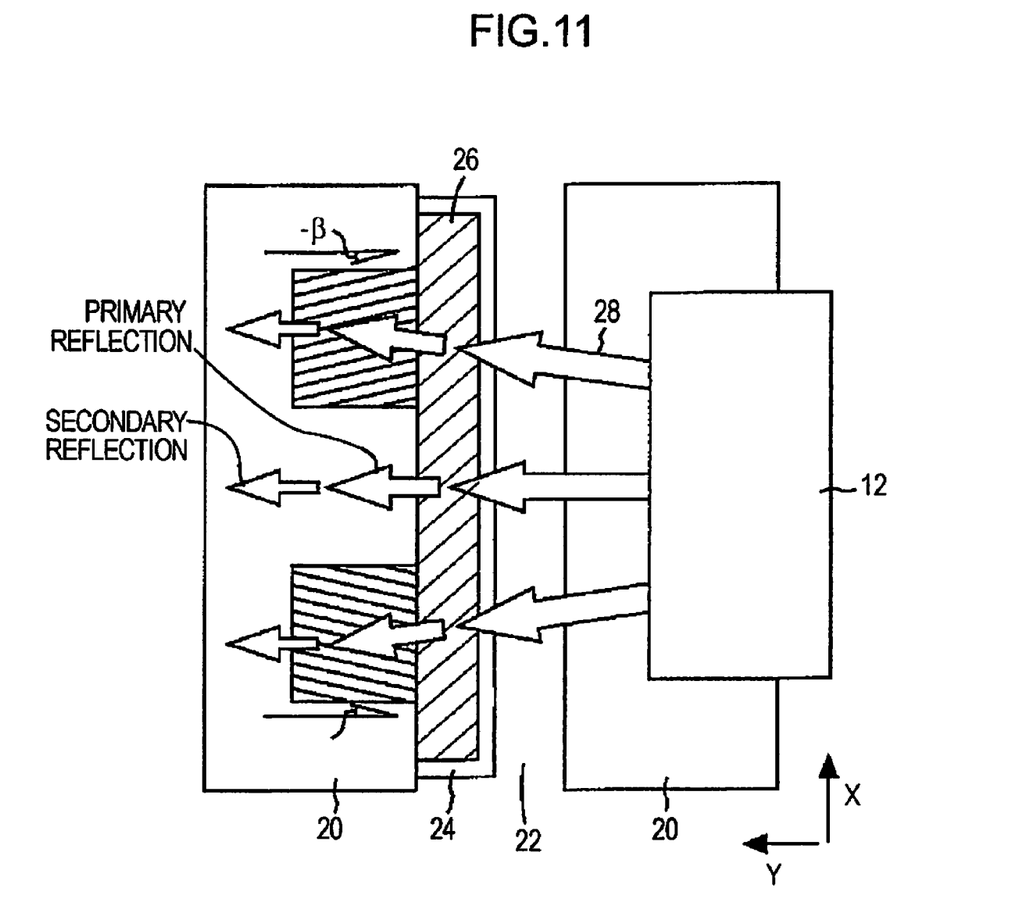
FIG. 11 is a plan view showing the relationship between the irradiation direction and reflection direction of ion beams and masks with reflective faces having end portions each having an orientation correction tilt angle $\beta$.

In general, as shown in FIG. 1B, ion beams applied to both ends of a substrate are likely to have a large spread angle. FIG. 11 shows the positional relationship between ion beams 28, a thin-film 26 disposed on a substrate 24, and masks 20 similar to the mask, shown in FIG. 9, for aligning the propagation directions of those ion beams in the desired orientation direction (the Y-axis direction in FIG. 9), these ion beams 28, this thin-film 26, and the masks 20 being present on the X-Y plane. Arrows shown in this figure indicate the propagation directions of these ion beams in the X-Y plane. The rightmost arrows indicate the propagation directions of these ion beams incident onto this thin-film 26, the central arrows indicate those of these ion beams primarily reflected, and the leftmost arrows indicate those of these ion beams secondarily reflected. These ion beams secondarily reflected are incident onto this thin-film 26 again. As shown in FIG. 11, the central one of these ion beams has an extremely small spread angle. Hence, reflective faces located in a center portion of each mask may be flat and parallel to this substrate such that the central ion beam propagates straight. Reflective faces located in end portions of the mask may be tilted in opposite directions such that the other ion beams offset from a desired orientation direction (the Y-axis direction) in opposite directions are aligned in the desired orientation direction. If, for example, a mask having a configuration shown in the enlarged view in FIG. 9 is used, the propagation directions of the other ion beams offset from the desired orientation direction in opposite directions can be aligned in the desired orientation direction in such a manner that the correction tilt angles β of reflective faces, arranged in a sawtooth pattern, located in end portions of the mask are set to β or negative β. When the absolute values of the angles of the ion beams, located outside, offset from the desired orientation direction are different from each other, it is effective to use a mask having reflective faces of which the correction tilt angles β are set depending on the offset angles. Furthermore, it is effective that the position of the mask shown in FIG. 11 is precisely adjusted using the mask tilt control section shown in FIG. 4 such that the tilt angle thereof is properly set.

Figure 12:
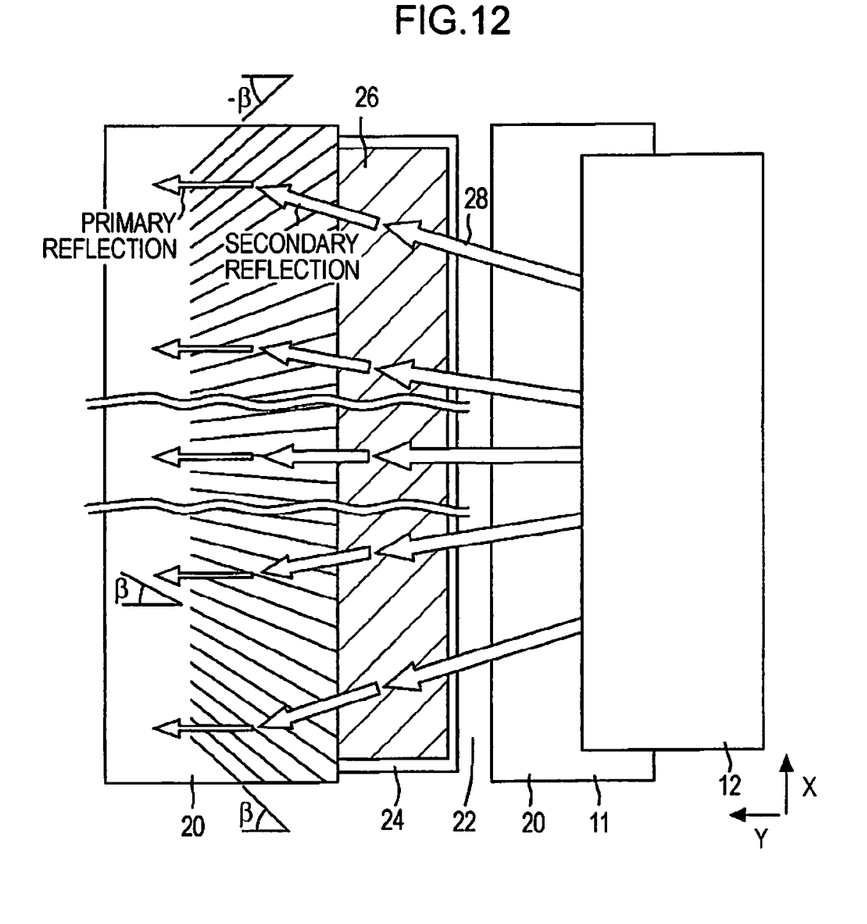
FIG. 12 is a plan view showing the relationship between the irradiation direction and reflection direction of ion beams and a mask with a reflective face having orientation correction tilt angles $\beta$ gradually increasing toward both ends of the reflective face.

FIG. 12 shows an example using masks 20 having reflective faces 34 of which the orientation correction tilt angle β increases stepwise (varies gradually) toward end portions of each mask that correspond to both ends of a substrate. The orientation correction tilt angles β of the reflective faces reflecting ion beams having large offset angles are set to large values depending on the spread angles of the ion beams and those of the reflective faces reflecting ion beams having small offset angles are set to small values, whereby the propagation directions of the ion beams applied over a thin-film 26 disposed on the substrate 24 can be aligned in a desired orientation direction. Furthermore, it is effective that the position of the mask shown in FIG. 12 is precisely adjusted using the mask tilt control section shown in FIG. 4 such that the tilt angle thereof is properly set. In the above description, the spread angle of the beams, that is, the angle of the beams offset from the desired orientation direction increases toward outside. If a mask having reflective faces of which the orientation correction tilt angle is set to correspond to the offset angle of the ion beams is used, an effective correction can be obtained. As described above, a uniform orientation direction can be achieved by improving the configuration of reflective faces of a mask. The following apparatuses and methods are as described above: apparatuses and methods for determining the shapes and arrangements of reflective faces of masks that reflect ion beams such that the ion beams are aligned in the desired orientation direction of a liquid crystal.

In another embodiment of the present invention, the pre-tilt angle of a liquid crystal can be controlled using ion beams reflected by reflective faces of a mask. If the shape and arrangement of the reflective faces are as shown in FIG. 13, the pre-tilt angle thereof can be desirably controlled by varying the incident angle of the ion beams that are reflected by the reflective faces and then applied to a thin-film disposed on a substrate.

An ordinary liquid crystal display is known to be operable in a twisted nematic (TN) mode and the longitudinal axes of liquid crystal molecules sandwiched between an upper substrate and a lower substrate are twisted by 90 degrees with respect to the upper and lower substrates. It is used for switching that the liquid crystal molecules are untwisted and the longitudinal axes of liquid crystal molecules are then aligned perpendicularly with respect to the substrates by the application of a voltage. In order to enhance the response of the liquid crystal molecules to the applied voltage and in order to eliminate the misalignment or alignment defect of the liquid crystal molecules, the longitudinal axes of the liquid crystal molecules need to be aligned such that the longitudinal axes thereof are tilted with respect to the substrates (that is, alignment layers) at a few degrees. The angle of the longitudinal axes of the liquid crystal molecules (the initial arrangement of the liquid crystal molecules to which no voltage is applied) with respect to the alignment layers is usually referred to as a pre-tilt angle. For alignment treatment by ion beam irradiation, it is known that the pre-tilt angle of a liquid crystal usually depends on the incident angle α of an ion beam with respect to a thin-film processed into an alignment layer. In a liquid crystal display having an initial arrangement in a vertical alignment (VA mode) as a wide viewing angle technology, a liquid crystal usually has a pre-tilt angle of about 90 degrees and it is used for switching that molecules of the liquid crystal are laid down and then aligned horizontally by the application of a voltage.

Figure 13:
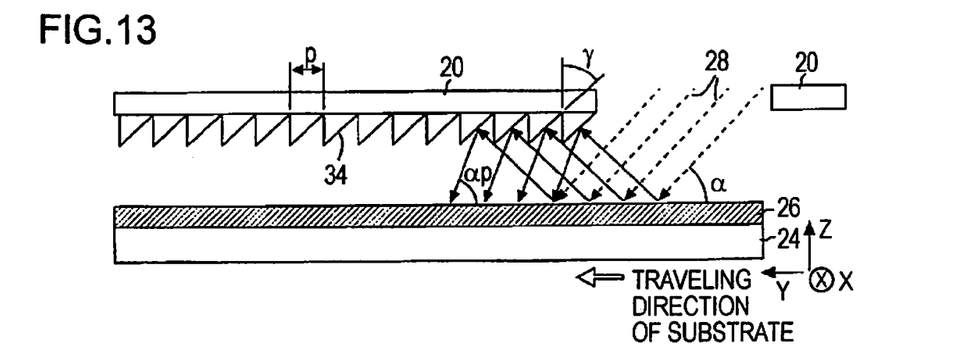
FIG. 13 is a sectional view of an exemplary mask (observed in the traveling direction of a substrate) for controlling the pre-tilt angle.

FIG. 13 shows a mask having reflective faces 34 arranged in a sawtooth pattern. The reflective faces 34 are spaced at a pitch p in parallel to the ion beam-irradiated region direction (the Y-axis direction) and have an appropriate face tilt angle γ. This allows the incident angle α of ion beams with respect to a thin-film to be set to a predetermined value depending on the pre-tilt angle of a liquid crystal. As shown in FIG. 13, the ion beams reflected by the thin-film 26 disposed on a substrate are secondarily reflected by the reflective faces repeatedly arranged; hence, the incident angle of the secondarily reflected ion beams with respect to the thin-film 26 is close to the right angle and corresponds to a pre-tilt angle. Thus, a pre-tilt angle close to 90 degrees can be achieved depending on the incident angle of the secondarily reflected ion beams. This provides a vertical alignment having good viewing angle properties. This is due to that the pre-tilt angle of the liquid crystal does not depend on the incident angle α of the ion beams primarily applied to the thin-film but the incident angle αp of the secondarily reflected ion beams (the ion beams which are finally applied to the thin-film and which can break the bonds between atoms in a surface domain of the thin-film). In this case, the pre-tilt angle of the liquid crystal can be varied without varying the orientation direction of the liquid crystal. Even if the incident angle α of the ion beams primarily applied to the thin-film is small due to constraints of an alignment layer-forming apparatus, the incident angle of the ion beams secondarily reflected can be set to substantially the right angle. The mask shown in FIG. 13 is an application for the liquid crystal, having a large pre-tilt angle, operable in a vertical alignment mode. The mask can be applied to the twisted nematic (TN) mode, an in-plane switching (IPS) mode in which liquid crystal molecules are rotated in a horizontal plane with an applied voltage, and the control of the incident angle of an ion beam used in a small pre-tilt angle (one to ten degrees) range by varying the reflective faces.

The following mask may be used: a mask, having reflective faces repeatedly arranged in a sawtooth pattern, for controlling the pre-tilt angle. The face tilt angle γ of the reflective faces are adjusted such that ion beams are reflected toward a substrate to be incident onto the substrate. The reflective faces extend along a region (the direction perpendicular to the plane of FIG. 3, or the Y direction in FIG. 3) irradiated with the ion beams. In this case, it is the key to set the tilt angle γ of the reflective faces. The orientation correction tilt angle β may be zero, that is, the ion beams may be reflected straight in the X-Y plane. It is effective that the mask has end portions which have an orientation correction tilt angle β and which are tilted flat faces. The reflective faces may be flat or curved.

The embodiments of the present invention are as described above. The present invention is not limited to the embodiments. Within the scope of the present invention, various improvements, modifications, and variations may be made on the basis of findings of those skilled in the art.

What is claimed is:

1. An method for forming a liquid crystal alignment layer in a thin-film on a substrate, comprising:
   a step for preparing a substrate whereon a thin-film is formed that will be a liquid-crystal alignment layer;
   a step for placing mask, having a reflective face on the substrate side, between the substrate and an ion source; and
   a step for conveying the substrate, irradiating the thin-film on the substrate with an ion beam emitted from the ion source, and reflecting the ion beam between the thin-film and the reflective face of the mask, reflecting the ion beam in the orientation direction from the reflective face of the mask;
   wherein:
      the traveling direction of the substrate, in which the substrate is conveyed, is the same direction as the direction in which the ion beam is illuminated.

2. The alignment layer-forming method according to claim 1, wherein the incident angle of the ion beam onto the thin-film is varied by reflecting the ion beam with the reflective face of the mask such that the alignment layer creates a predetermined pre-tilt angle.

3. The alignment layer-forming method according to claim 1, wherein the reflective face of the mask is formed such that the spread angle of the ion beam is corrected.

* * * * *